(12) United States Patent
Hosokawa et al.

(10) Patent No.: US 11,655,898 B2
(45) Date of Patent: May 23, 2023

(54) CRYOGENIC GLOBE VALVE

(71) Applicant: KITZ CORPORATION, Chiba (JP)

(72) Inventors: Mitsuru Hosokawa, Chiba (JP); Tetsuya Watanabe, Chiba (JP)

(73) Assignee: KITZ CORPORATION, Chiba (JP)

( * ) Notice: Subject to any disclaimer, the term of this patent is extended or adjusted under 35 U.S.C. 154(b) by 0 days.

(21) Appl. No.: 17/290,588

(22) PCT Filed: Nov. 1, 2019

(86) PCT No.: PCT/JP2019/043014
§ 371 (c)(1),
(2) Date: Apr. 30, 2021

(87) PCT Pub. No.: WO2020/091037
PCT Pub. Date: May 7, 2020

(65) Prior Publication Data
US 2022/0003324 A1    Jan. 6, 2022

(30) Foreign Application Priority Data

Nov. 1, 2018    (JP) ............................. JP2018-206409

(51) Int. Cl.
*F16K 1/38*    (2006.01)
*F16K 1/48*    (2006.01)
*F16K 25/00*   (2006.01)

(52) U.S. Cl.
CPC .................. *F16K 1/38* (2013.01); *F16K 1/48* (2013.01); *F16K 25/005* (2013.01)

(58) Field of Classification Search
CPC .... F16K 1/38; F16K 1/48–487; F16K 25/005; F16K 1/36
See application file for complete search history.

(56) References Cited

U.S. PATENT DOCUMENTS

| 1,411,904 | A | * | 4/1922 | Bloch | .................... F16K 1/482 251/86 |
| 2,848,187 | A | * | 8/1958 | Henry | ....................... F16K 1/20 251/86 |

(Continued)

FOREIGN PATENT DOCUMENTS

| CN | 103791104 A | * | 5/2014 | ............... F16K 1/02 |
| CN | 203670839 |   | 6/2014 | |

(Continued)

OTHER PUBLICATIONS

International Search Report dated Jan. 21, 2020 in International (PCT) Application No. PCT/JP2019/043014.

(Continued)

*Primary Examiner* — Marina A Tietjen
(74) *Attorney, Agent, or Firm* — Wenderoth, Lind & Ponack, L.L.P.

(57) ABSTRACT

A cryogenic globe valve that prevents a high sealing property and safety from being lost even through a large number of times of opening and closing for a cryogenic fluid and is easily maintained, although it has a simple structure. The cryogenic globe valve has an axial cylindrical portion as a long-neck structure extended to its body, in which a resin-made valve disk having a conical surface having a reduced-diameter tapered shape is attached to a lower end of an elongated stem such that the resin-made valve disk is three-dimensionally operable with respect to the stem even under an extremely low-temperature condition.

12 Claims, 9 Drawing Sheets

(56) References Cited

U.S. PATENT DOCUMENTS

| | | | | |
|---|---|---|---|---|
| 3,030,977 | A | * | 4/1962 | Werner ..................... F27B 1/20 |
| | | | | 137/340 |
| 3,141,474 | A | * | 7/1964 | Gentzel ................. F16K 17/082 |
| | | | | 251/86 |
| 3,787,023 | A | | 1/1974 | Shufflebarger et al. |
| 4,089,504 | A | * | 5/1978 | Giuliani .................. F16K 25/00 |
| | | | | 251/86 |
| 4,844,411 | A | | 7/1989 | Nelson |
| 6,302,374 | B1 | * | 10/2001 | Fink ........................ F16K 41/02 |
| | | | | 251/368 |
| 2017/0082216 | A1 | * | 3/2017 | Smithson .............. F16K 17/168 |

FOREIGN PATENT DOCUMENTS

| | | | | |
|---|---|---|---|---|
| CN | 204 922 015 | | 12/2015 | |
| DE | 2827527 A1 | * | 1/1980 | |
| EP | 0244185 A2 | * | 11/1987 | |
| EP | 1111280 A1 | * | 6/2001 | ............... F16K 1/46 |
| GB | 2389881 A | * | 12/2003 | ............. F16K 1/422 |
| JP | 55-18637 | | 7/1980 | |
| JP | 55-18638 | | 7/1980 | |
| JP | 5789092 | | 10/2015 | |
| JP | 6745123 | | 8/2020 | |
| WO | 2018/102099 | | 6/2018 | |

OTHER PUBLICATIONS

Extended European Search Report dated Jun. 13, 2022 in corresponding European Patent Application No. 19879986.

* cited by examiner

CRYOGENIC GLOBE VALVE

BACKGROUND OF THE INVENTION

1. Technical Field

The present invention relates to a cryogenic globe valve, and more particularly to a cryogenic globe valve appropriate for liquefied hydrogen.

2. Description of the Related Art

Although in situations such as transfer and storage of various types of low-temperature to cryogenic fluids such as liquefied ammonia, propane, ethane, or ethylene having a boiling point in a range of about −40 to −100° C., for example, or liquefied natural gas (LNG) at a temperature of −163° C. for complementing petroleum as a clean energy source, centered around fields of low-temperature industries such as a petrochemical industry, a petroleum refining industry, and various types of chemical industries, and further liquefied oxygen at a temperature of −183° C. or a liquefied nitrogen at a temperature of −195.8° C. in a space exploration equipment industry, various types of low-temperature fluid control valves such as a globe, a ball, a gate, and a butterfly have been generally used, particularly a (single-seated) globe valve is significantly small in valve seat leakage amount at the time of valve closing, and particularly the valve of the type including a manual handle has been most frequently used among the valves. In this low-temperature valve, to cope with various types of problems caused by use of the low-temperature fluid, an extremely high quality has also been usually required for a selection level and a manufacturing process of a material for a valve component such as a body, a bonnet, or a packing than those in a valve that controls a fluid at a normal temperature.

Particularly in recent years, a demand for hydrogen has been increasing as a clean fuel with a worldwide regulation of an amount of carbon dioxide emission such as enforcement of the Kyoto Protocol. Hydrogen is ideal as a clean energy source because it only produces water, unlike natural gas that produces carbon dioxide, when burned in principle, while hydrogen has a significantly small molecular weight, and thus its boiling point reaches even −252.8° C. Thus, there have been known, in a valve that handles a hydrogen fluid, problems specific to hydrogen that a material characteristic under a temperature between an extremely low temperature and a normal temperature significantly changes and that hydrogen gas is easily absorbed in a steel material to cause hydrogen embrittlement for lowering the strength of the steel material, for example.

Patent Literatures 1 to 4 have conventionally been known as a cryogenic globe valve capable of using even liquefied hydrogen as a fluid to be used. Any one of the valves has adopted a heat shielding structure in which a distance between a flow path contacting a low-temperature fluid and an operation handle (operation portion) provided under a normal temperature is large. Particularly the literatures 2 to 4 each disclose a cryogenic globe valve provided with a vacuum jacket for preventing vaporization (boil-off) of a liquid by vacuum-insulating the inside and the outside of the valve and considered for liquefied hydrogen.

Patent Literature 1 has a problem that the cryogenic globe valve is not affected by contraction of a resin-made valve disk due to a decrease in temperature. The resin-made valve disk in the literature has a flat seal structure in which a soft packing made of annular resin is seated flat on an annular valve seat, and the soft packing is also fixed and detachably attached to the valve seat with a sheet presser and a nut to be exposed to a primary-side flow path at the time of valve closing. It is described that in a fully closed state under an extremely low temperature, the soft packing enters a state where it has fallen to a lowest position by a stem and a state where it has further fallen by an amount corresponding to a predetermined gap and a seal pressure correction spring springs back the resin-made valve disk to keep a seal pressure in the fully closed state in this state.

More specifically, it is described that the resin-made valve disk is mounted with a larger relative movement in an axial direction than a maximum allowance for contraction in the axial direction due to a decrease in temperature permitted on an outer periphery at a distal end of a valve rod for the gap, and the gap is provided between the valve presser and a bottomed cylindrical portion as a larger gap than the allowance for contraction. As a specific full closing operation, in a range where there occurs no gap because the valve presser and a radial swelling portion contact each other (a range where the packing does not contact the valve seat), the resin-made valve disk rotates integrally with the outer periphery at the distal end of the valve rod via the valve presser (rotation stopper member), and the outer periphery at the distal end of the valve rod is not fastened to the inner periphery of the valve presser but is fitted thereinto after the packing contacts the valve seat. Thus, it is understood that a gap occurs after the valve rod further falls and the valve presser separates from the radial swelling portion.

In Patent Literature 2, a male threaded portion is protruded in an axial direction at a central position of a lower end surface of a stem, and an annular resin-made packing is detachably fixed to the male threaded portion with a nut with a gland fitted thereinto. In Patent Literature 2, a fastening force with the nut is almost lost by contraction of the packing at an extremely low temperature for two routes, i.e., a normal leakage space occurring between the packing and a valve seat and a back leakage space occurring between the packing and the gland and a resin-made valve disk at the time of valve closing. Accordingly, a sealing force for the two leakage routes at the time of full closing is almost produced due to only a pressing force for the valve rod fastening the packing. Thus, the pressing force equally acts on both the two leakage spaces, to eliminate a deviation of the force. After paying attention to prevention of a leakage via particularly the back leakage space, it is understood that a peripheral groove is carved on an upper surface of the packing to adjust respective contact areas of both the two leakage spaces (more specifically, to reduce the contact areas on the upper surface of the packing) to make the respective contact areas of the leakage spaces substantially equal to each other.

Patent Literatures 3 and 4 each disclose a resin-made valve disk in which there occurs no gap because a valve disk surface exposed to a primary-side flow path is integrally formed of resin at least at the time of valve closing. In Patent Literature 3, a resin-made valve disk having a substantially cone shape is concentrically coupled to a disk retainer in a lower part of a stem via a stud portion and is configured such that a valve disk seal surface having a tapered shape can adhere to a valve seat seal surface having a tapered shape at the time of valve closing. The point that stud coupling of the resin-made valve disk fixes and reinforces pins such as a spring pin, a roll pin, and a dwell pin in a transverse direction intersecting a direction along an axial center of the resin-made valve disk has also been described.

More specifically, the literature 3 describes that when a pin made of stainless steel is used as the pins, while a pin made of fluorine resin (KEL-F) is used as a valve disk, a valve disk made of fluorine resin more greatly contracts than the pin made of stainless steel to exert a large force on the pin because a shrinkage rate of the valve disk made of fluorine resin is significantly larger than that of the pin made of stainless steel under an extremely low temperature, resulting in a tight fit of the resin-made valve disk.

In Patent Literature 4, a resin-made valve disk (packing) having a substantially spherical shape is integrally formed, a resin-made valve disk in which no gap occurs on the valve disk surface side including a seal surface at the time of valve closing is used, the resin-made valve disk screws a male thread concentrically formed at the center of an upper surface of a stem into a female thread concentrically formed at the center of a lower surface of the stem, and a peripheral projecting edge provided further below the female thread of the stem is caulked toward a peripheral stepped portion provided on the lower periphery of the male thread in the resin-made valve disk, whereby the resin-made valve disk is fixed to the stem by both means for screwing and caulking, like in Patent Literature 3 as described above.

CITATION LIST

Patent Literatures

PTL 1: Japanese Patent Laid-Open No. 2017-172754
PTL 2: Japanese Utility Model Publication No. S55-18638
PPL 3: U.S. Pat. No. 6,302,374
PTL 4: Japanese Utility Model Publication No. 55-18637

SUMMARY OF THE INVENTION

1. Technical Problem

However, in Patent Literature 1, components to be required, such as a nut and a sheet presser, in addition to a seal pressure correction spring (a plurality of disc springs) and a spring presser, increase in number even if limited to only a configuration of a resin-made valve disk site to be always exposed to at least a cryogenic fluid. Thus, at least productivity is bad, and many components respectively having different characteristics may be separately denatured by one another under an extremely low temperature, to cause an unexpected malfunction or failure such as a defective operation or a decrease in life. Therefore, it can be said that the cryogenic valve is also bad in usability and maintenability as a valve. As components constituting the cryogenic valve, the cryogenic valve is desirably simply constituted by as a small number of components as possible. As described above, the cryogenic valve has a structure in which a gap (e.g., between a sheet presser or a nut and a soft packing or a resin-made valve disk) may occur on a surface of the valve disk at the time of valve closing. Thus, a back leakage may occur from the gap.

Further, under an extremely low temperature, a gap that permits an allowance for thermal contraction of the soft packing as described above is compensated for with a resilient force produced by a seal pressure correction spring. Thus, the soft packing in a thermal contraction state is further compressed. When the soft packing thus continues to be compressed every valve closing, the soft packing of the resin-made valve disk may be fastened to the inside of an accommodation groove with flexibility almost lost by freezing under the extremely low temperature.

As can be seen in many conventional techniques in Patent Literatures 1 to 4, for example, the cryogenic globe valve is generally a long neck of an elongated stem, and has a structure in which the stem rises and falls while rotating via screw fastening with the stem set on the male screw side and thus has a structure in which a stem axial center is difficult to coaxially maintain with high accuracy every time a screw rises or falls. Accordingly, there may easily occur a phenomenon that the stem axial center does not accurately match a valve seat axial center but is seated with the respective centers shifting even slightly. Particularly for the cryogenic globe valve, one end on the operation side of the elongated stem and the other end on the resin-made valve disk side thereof are respectively exposed for a long period to situations under a normal temperature and under an extremely low temperature. Thus, such a shift of the stem axial center easily occurs in combination with an effect of material denaturation caused by an extreme temperature difference. A structure of the cryogenic globe valve can be said to be a structure in which the stem axial center may easily shift due to some factors such as an elongated stem, screw fastening, and a temperature difference. Moreover, a high sealing performance is generally required for the cryogenic globe valve. Thus, even if the shift is slight, an unignorable problem, as described below, occurs.

In Patent Literature 1, when the soft packing remains fastened, as described above, the resin-made valve disk remains integrally merging with the stem as a substantially solid mass. Thus, when the stem axial center remains inclined with respect to the valve seat axial center, the inclination of the stem becomes an inclination of a valve disk axial center as it is. The resin-made valve disk as a substantially solid mass is forced to be seated on a valve seat while remaining inclined without the inclination of the axial center being corrected because the flexibility of the resin-made valve disk is almost lost under an extremely low temperature, and thus a capability of keeping a sealing property by exhibiting elasticity to self-correct the shift is lost.

Therefore, adaptability for ensuring a high sealing property between a valve disk seal surface and a valve seat seal surface is not recovered while remaining lost, but a sealing property of the valve is lost, especially when the resin-made valve disk remains fastened to the stem while remaining deformed and cured with respect to a shape under a normal temperature of the resin-made valve disk as the resin-made valve disk thermally contracts. A shift of the valve disk axial center with respect to the valve seat axial center is also caused by a change in shape of the resin-made valve disk in addition to being caused by the shift of the stem axial center, as described above. Particularly, in the literature 1, the cryogenic globe valve has a flat seal structure by planar surface contact. Thus, if flatness of the packing is even slightly lost, a sealing property of the valve is greatly adversely affected.

In Patent Literature 2, the cryogenic globe valve is also configured such that a gap occurs on a surface of a resin-made valve disk at the time of valve closing. A back leakage from the gap via a packing is a problem in the literature. Although the cryogenic globe valve has a valve disk structure in which the back leakage is inevitable, i.e., a simple structure, it should be said that the structure is insufficient as a valve structure requiring a sufficient sealing property. A member (male screw) for fixing the packing is inserted into a hollow region within the packing and is fixed thereto with a nut. Thus, the patent literature 2 is similar to the above-described literature 1 in that the packing contracts as the packing thermally contracts or the valve is opened or closed, and as a result the resin-made valve disk may be fastened to a stem as a substantially solid mass, as described above.

A resin-made valve disk in each of Patent Literatures 3 and 4 does not have a gap in which a back leakage occurs because a fluid wraps around the rear side of the valve disk as described above. However, the inside of the resin-made valve disk is only fixed to a stem, but an outer peripheral surface of the resin-made valve disk is fixed to the stem by screwing, fitting, and caulking. Thus, a reliable fixing property of the resin-made valve disk is not ensured. Particularly if opening/closing of the valve is repeated for a long period with a stem axial center inclined with respect to a valve seat axial center, as described above, the fixing strength of the resin-made valve disk is easily deteriorated. In some cases, the resin-made valve disk may be dropped. Moreover, the resin-made valve disk thermally contracts under an extremely low temperature, and an allowance for thermal contraction of the resin-made valve disk is larger than that of a stem made of a metal as a fixing destination. Thus, an outer peripheral surface of the valve disk as a fixing portion of the valve disk greatly contracts, whereby the fixing strength of the resin-made valve disk is further deteriorated.

In the literatures 3 and 4, an inclination of the stem axial center also occurs, as described above. If the stem is seated while being inclined, the resin-made valve disk is closed while remaining inclined because it does not have a function of correcting the inclination to compensate for a sealing property. Thus, the cryogenic globe valve has a structure in which a high sealing property of the valve is difficult to maintain, like in the above-described literatures 1 and 2.

The literature 3 describes the point that fixing of the resin-made valve disk is reinforced by a transverse pin to be inserted into the resin-made valve disk and the resin-made valve disk tight-fits the pin under a low temperature condition due to a difference in shrinkage rate between materials. However, when the resin-made valve disk has been thus actually fastened to the stem, the resin-made valve disk remains fastened to the stem as a substantially solid mass, as described above. Thus, seating with the stem axial center inclined, as described above, cannot be coped with, and a high sealing property cannot be maintained. A conventional technique in which such a problem is disclosed or suggested or is solved does not exist. This problem can only be an urgent problem specific to the cryogenic globe valve.

The present invention has been developed to solve the above-described problems, and has its object to provide a cryogenic globe valve that prevents a high sealing property and safety from being lost even through a large number of times of opening/closing for a cryogenic fluid and is easily maintained, although it has a simple structure.

2. Solution to the Problem

To attain the above-described object, the invention provides a cryogenic globe valve having an axial cylindrical portion as a long-neck structure extended to its body, in which a resin-made valve disk having a conical surface having a reduced-diameter tapered shape is attached to a lower end of an elongated stem such that the resin-made valve disk is three-dimensionally operable with respect to the stem even under an extremely low-temperature condition.

The invention also provides the cryogenic globe valve, in which an attachment portion provided in an upper part of the resin-made valve disk is inserted into an insertion portion provided in a lower end of the stem, a through hole is formed in a direction intersecting a length direction of the stem in the insertion portion and the attachment portion, a fixing member is inserted into the through hole to attach the attachment portion and the lower end of the stem to each other, and a gap is provided between the fixing member and the through hole, to maintain a clearance so that the resin-made valve disk is movable with respect to the gap when the resin-made valve disk thermally contracts.

The invention also provides the cryogenic globe valve, in which an insertion portion provided in an upper part of the resin-made valve disk is inserted into an attachment portion provided in a lower end of the stem, a through hole is formed in a direction intersecting a length direction of the stem in the attachment portion and the insertion portion, a fixing member is inserted into the through hole to attach the insertion portion and the lower end of the stem to each other, and a gap is provided between the fixing member and the through hole, to maintain a clearance so that the resin-made valve disk is movable with respect to the gap when the resin-made valve disk thermally contracts.

The invention also provides the cryogenic globe valve, in which an engagement portion provided in an upper part of the resin-made valve disk engages with an attachment groove provided in a lower end of the stem, and the resin-made valve disk and the lower end of the stem are attached to each other with a predetermined gap interposed therebetween, to maintain a clearance so that the resin-made valve disk is movable with respect to the gap when the resin-made valve disk thermally contracts.

The invention also provides the cryogenic globe valve, in which an angle of a valve disk seal surface of the resin-made valve disk is smaller than an angle of a valve seat seal surface provided in the body.

The invention also provides the cryogenic globe valve, in which a vertical width of the clearance between the through hole and the fixing member under an extremely low-temperature condition is set to 0.5% or more of a seal diameter of the resin-made valve disk.

The invention also provides the cryogenic globe valve, in which a ground portion is provided at an upper end of the axial cylindrical portion, and an upper part of the axial cylindrical portion is made to have a bellows structure such that a cryogenic fluid as liquefied hydrogen does not flow into the ground portion side and is made to have a ground sealing structure sufficient for a hydrogen fluid at a pressure exceeding an atmospheric pressure to leak out of the ground portion.

3. Advantageous Effects of the Invention

According to the invention, there is provided a cryogenic globe valve having an axial cylindrical portion as a long-neck structure extended to its body, in which a resin-made valve disk having a conical surface having a reduced-diameter tapered shape is attached to a lower end of an elongated stem such that the resin-made valve disk is three-dimensionally operable with respect to the stem even under an extremely low-temperature condition. Thus, the resin-made valve disk can finely operate with respect to the stem without remaining completely fastened to the stem even under the extremely low-temperature condition.

Accordingly, even if a valve disk axial center contacts a valve seat axial center while being inclined therefrom due to a shift from a stem axial center and the valve seat axial center and deformation and curing of the resin-made valve disk, for example, the resin-made valve disk and a valve seat on their respective tapered surfaces are naturally aligned only by further pressing the valve disk toward the valve seat via the stem, whereby such an alignment effect that a valve disk seal surface is seated on a valve seat seal surface in a correct posture can be obtained. Accordingly, a shift between the seal surfaces due to an inclination of the stem and thermal contraction of the resin-made valve disk or the like can be prevented. Even under the extremely low-temperature condition, a high sealing property of the valve can be kept good for a long period, and time and effort for maintenance can also be saved. Further, a reaction to be received from the valve seat seal surface is dispersed without deviating by exhibiting the alignment effect. Thus, a stress is not easily concentrated on the cured resin-made valve disk. Therefore, a deterioration due to a damage, a crack, or the like of the resin-made valve disk does not easily occur.

According to another aspect of the invention, a through hole is formed in a direction intersecting a length direction of the stem in the lower end of the stem and an upper part of the resin-made valve disk, and a fixing member is inserted into the through hole to fasten the stem and the resin-made valve disk to each other. Thus, the resin-made valve disk can be easily attached to the lower end of the stem, and the fixing member is not exposed to the valve disk surface side facing a primary-side flow path. Therefore, a gap capable of causing a back leakage at the time of valve closing is not formed on the valve disk surface side.

According to another aspect of the invention, a separate member for attaching the resin-made valve disk to the stem, for example, a bolt is not required so that the number of components is small, which is appropriate as a configuration of the cryogenic globe valve and is also appropriate for durability and maintenability of the valve.

According to another aspect of the invention, respective taper angles of a valve disk seal surface and the valve seat seal surface differ from each other. Thus, seating at the different taper angles enables the seal surfaces to be ensured in a line contact shape. Therefore, a high seal surface pressure can be exhibited.

According to another aspect of the invention, a gap between the through hole and the fixing member under an extremely low-temperature condition is set to 0.5% or more of a seal diameter of the resin-made valve disk. Thus, a degree of freedom for a three-dimensional fine operation required when an alignment effect acts on the valve disk can be appropriately ensured.

According to another aspect of the invention, a ground portion is provided at an upper end of the axial cylindrical portion, and an upper part of the axial cylindrical portion is made to have a bellows structure such that liquefied hydrogen does not flow into the ground portion side and is made to have a ground sealing structure sufficient for a hydrogen fluid at a pressure exceeding an atmospheric pressure to leak out of the ground portion. Thus, even if valve opening/closing is repeated by the bellows structure following rise and fall of the stem, flow of the liquefied hydrogen into the ground portion side is reliably sealed. In addition, when the liquefied hydrogen flows into the ground portion side because a problem occurs in a sealing performance of the bellows structure, the liquefied hydrogen appropriately leaks out of the ground portion, whereby the leakage can be immediately detected by an external detection device or the like. Accordingly, the problem of the bellows structure can be immediately recognized. For example, a damage to the ground portion, for example, occurring because a leakage and a stay of a cryogenic fluid toward the ground portion side via the bellows structure are left without being recognized can be avoided in advance.

DETAILED DESCRIPTION OF EMBODIMENTS

Figure 1:
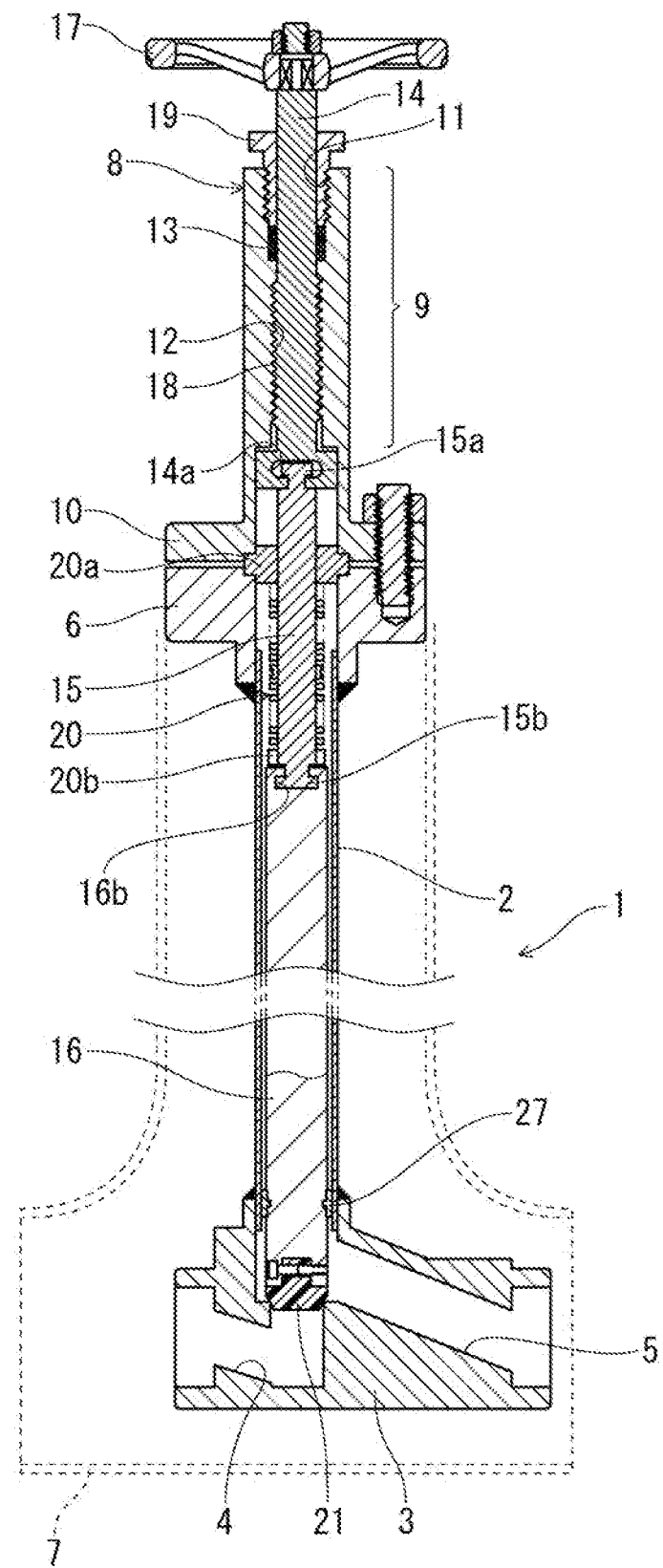
FIG. 1 is a front longitudinal sectional view illustrating a valve closed state of a cryogenic globe valve in this example.
Figure 2:
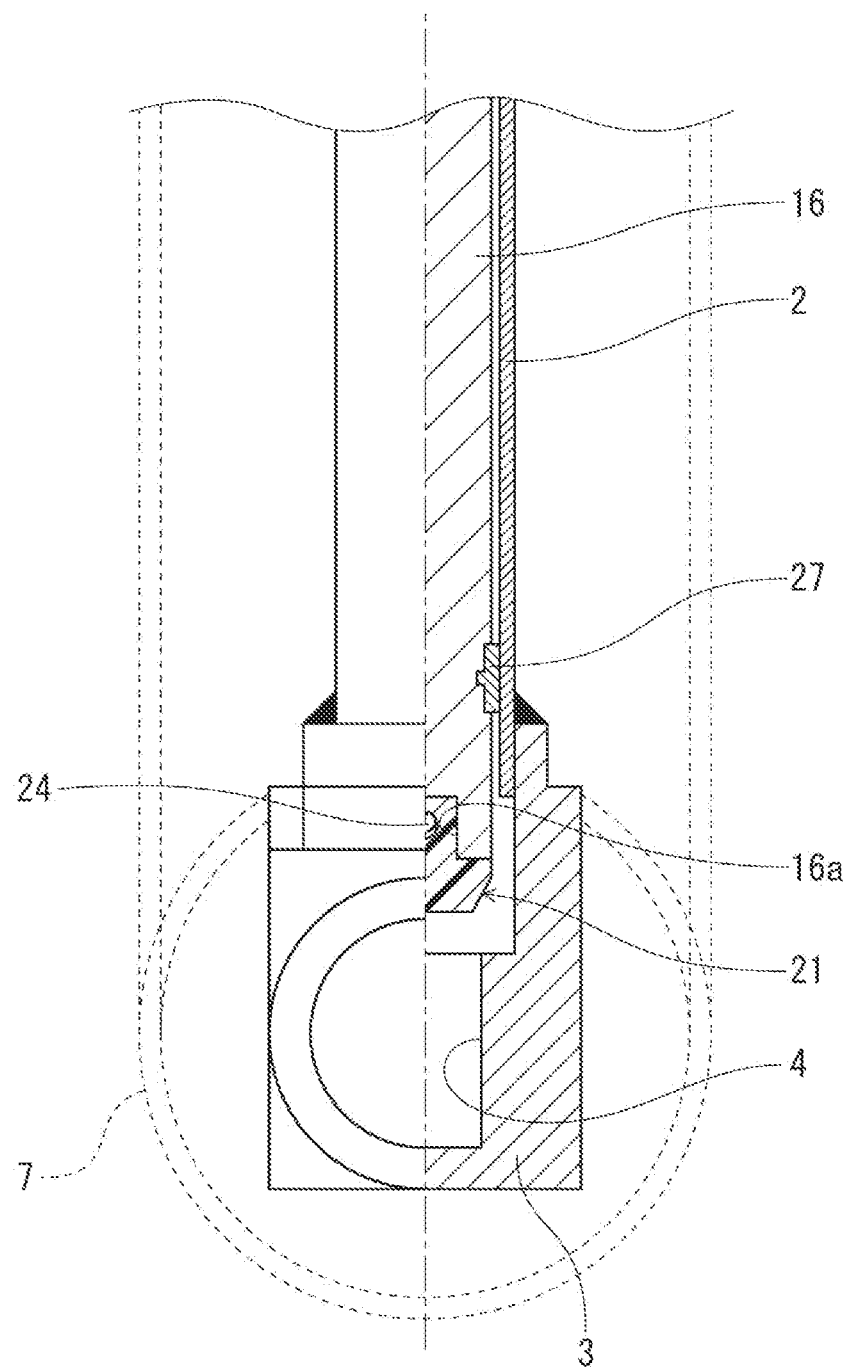
FIG. 2 is a partially enlarged sectional view obtained by enlarging a part of a side view of FIG. 1 and illustrating an opened state of the valve.

An embodiment of the present invention (this example) will be described in detail below with reference to the drawings. FIG. 1 is a longitudinal sectional view of a cryogenic globe valve in this example, and FIG. 2 is a partially enlarged sectional view obtained by enlarging a cross-sectional view of a part of a body 1 illustrated in FIG. 1 as viewed from the side. FIG. 1 illustrates a valve closed state, and FIG. 2 illustrates a valve opened state.

In FIG. 1 and FIG. 2, the body 1 includes an axial cylindrical portion 2 extended toward a handle 17 from the body 1 side in a substantially vertical direction and a body portion 3 having a flow path in a lower part of the body 1 formed in its inner part. In the flow path, a primary-side flow path 4 and a secondary-side flow path 5 are inclined and carved. The axial cylindrical portion 2 and the body portion 3 are bonded to each other with a welding portion interposed therebetween, and the axial cylindrical portion 2 and a flange portion 6 at its upper end are also bonded to each other with a welding portion interposed therebetween.

In this example, liquefied hydrogen at an extremely low temperature is set as a fluid to be used. Thus, a cutting product is used for all members that can contact the fluid, such as the body portion 3 and the axial cylindrical portion 2 to prevent hydrogen embrittlement or the like. In the present application, the extremely low temperature means a boiling point of −163° C. or less of at least liquefied natural gas (LNG), and is applied to a temperature of liquefied hydrogen (a cryogenic fluid having a temperature of approximately −253° C.) in this example.

In FIG. 1 and FIG. 2, a vacuum jacket 7 indicated by a dotted line is a jacket that can maintain a vacuum in a space between the body 1 and itself, and heat dissipation of the fluid within the flow path is blocked due to vacuum insulation by the vacuum jacket 7 so that an extremely low temperature of the fluid can be effectively kept. In this example, an outer periphery at a lower end of the flange portion 6 is closed, to surround the body 1 from the axial cylindrical portion 2 to the body portion 3 and further surround a piping to be bonded in a transverse direction not illustrated. A specific configuration such as a material and a shape of the vacuum jacket 7 is optionally selectable depending on implementation.

In FIG. 1 and FIG. 2, a bonnet 8 has a ground portion 9 in its upper part and has a flange portion 10 at its lower end. The flange portion 10 is fixed to the flange portion 6 in the axial cylindrical portion 2 with a bolt and a nut, and is fastened to an upper part of the body 1 with the flange portions 6 and 10 overlapping each other. Female threaded portions 11 and 12 are respectively provided in upper and lower parts of an inner peripheral surface of the ground portion 9, and a plurality of (three) ground packings 13 for a pivotal mounting seal are longitudinally stacked.

The cryogenic globe valve in this example is configured such that upper and lower ends of the axial cylindrical portion 2 are bonded to each other by welding, each of pipings in a transverse direction not illustrated to be respectively bonded to the primary-side flow path 4 and the secondary-side flow path 5 is also bonded to the body portion 3 by welding, and further all bonding portions are basically bonded to one another by welding, to completely block a cryogenic fluid in its inner part from outside. Thus, the inside of the body 1 can usually be opened to outside only by removing the flange portion 10 in the bonnet 8. Therefore, the inside of the valve is maintained by attachment and detachment of the bonnet 8.

In FIG. 1 and FIG. 2, a structure of a stem formed in an elongated shape is optionally selectable depending on implementation. However, the stem in this example has a three-split structure including a handle stem 14, an upper stem 15, and a lower stem 16. In the handle stem 14, a manual handle 17 is fixed to its upper end with a nut, and a male threaded portion 18 is provided in its lower part. The male threaded portion 18 is screwed into the female threaded portion 12 in the bonnet 8. The stem can rise and fall as the screwed threaded portions rotate, as described below. This example is an example of a manual valve, but is not limited to the manual valve. For example, this example is configured to make the rise and fall of the stem automatically controllable by separately including an actuator. A driving mechanism of the valve is also optionally selectable depending on implementation.

In FIG. 1, a gland 19 fastens and fixes the ground packing 13 stacked in a lower end of the gland 19 by screwing a male threaded portion on its outer periphery into the female threaded portion 11 in the bonnet 8, to pivotally seal the valve by the fastening.

Therefore, the stem in this example is pivotally attached to such a pivotal sealing structure by screwing the male threaded portion 18 and the female threaded portion 12 into each other.

The ground packing 13 is not particularly limited. As to bellows 20, described below, when hydrogen gas has leaked out toward the ground portion 9 from the flow path side via the bellows 20 because any problem has occurred in a sealing performance of the bellows 20 (in this case, has leaked out of the outer periphery side to the inner periphery side of the bellows 20 in the structure in this example), hydrogen gas has a property of expanding in volume to approximately 600 times by vaporization caused by a temperature rise. Thus, when the ground packing 13 completely seals hydrogen gas, hydrogen gas that has leaked out to a region between the bellows 20 and the ground portion 9 to rapidly expand is sealed. In this case, there is no means for immediately recognizing a problem that has occurred in the bellows (a leakage state of hydrogen gas) from outside. Thus, hydrogen gas remains sealed inside. In some cases, hydrogen gas may be rapidly ejected from the ground portion 9.

In this example, the ground portion 9 adopts a configuration in which hydrogen gas exceeding an atmospheric pressure leaks out when a pressure of the hydrogen gas is applied thereto from inside, to prevent the hydrogen gas from being sealed into the ground portion 9 and enable the hydrogen gas to leak out to outside. The ground portion 9 is configured to enable a hydrogen detection device not illustrated appropriately provided in the vicinity of the outside of the ground portion 9 to immediately detect hydrogen gas when the hydrogen gas has leaked out. Thus, a safety countermeasure has been taken against a damage to at least the bellows 20. In other words, the structure in this example is a ground sealing structure sufficient for cryogenic gas exceeding an atmospheric pressure to leak out of the ground portion 9 and a sealing structure sufficient to be able to prevent entrance of a solid foreign substance from outside.

The ground portion 9 can be configured by appropriately adjusting the number and the type of the ground packings 13 and a fastening force of the gland 19, for example. More specifically, for example when hydrogen gas exceeding an atmospheric pressure has acted on the ground portion 9, hydrogen gas can leak out via a gap between the ground packing 13 and the gland 19 or a gap occurring due to deformation of the ground packing 13.

In FIG. 1, an upper flange portion 15a at an upper end of the upper stem 15 is coupled to an engagement portion 14a at a lower end of the handle stem 14 in a sliding fit state. Specifically, the upper flange portion 15a having a solid disk shape engages with the inside of the engagement portion 14a having a hollow disk shape. For the engagement, a sliding property is ensured not using a separate member such as a gasket but application of grease or the like. For example, the engagement portion 14a (the handle stem 14) is made of copper, and the upper flange portion 15a (the upper stem 15) is made of stainless. Due to such an engagement structure, even if the engagement portion 14a rotates, rotational friction is not transmitted to the upper flange portion 15a. Thus, as the engagement portion 14a rotates to rise and fall, only an elevating operation is transmitted to the upper flange portion 15a. The lower flange portion 15b having a solid disk shape is also provided at a lower end of the upper stem 15, and engages with an engagement portion 16b having a hollow disk shape at an upper end of the lower stem 16. Due to such an engagement structure, elevating motion of the upper stem 15 is transmitted to the lower stem 16.

Although the lower stem 16 is provided in an elongated and substantially columnar shape, and its outer diameter is slightly smaller than an inner diameter of the axial cylindrical portion 2, the lower stem 16 is provided to be smoothly movable up and down while an outer periphery of the lower stem 16 is guided to the inner diameter of the axial cylindrical portion 2 by a guide portion 27 provided in its lower part. A resin-made valve disk 21 is fastened to a lower end of the lower stem 16 with a predetermined attachment structure (an insertion portion 16a and an attachment portion 21c) between the stem and the resin-made valve disk interposed therebetween, as described below.

In FIG. 1, an upper part of the axial cylindrical portion 2 is made to have a bellows structure such that a cryogenic fluid does not flow into the ground portion 9 side provided at an upper end of the axial cylindrical portion 2. In the bellows 20 in this example, an attachment portion 20a at its upper end is sandwiched and fixed between the flange portion 10 in the bonnet 8 and the flange portion 6 in the axial cylindrical portion 2, and a lower end portion 20b is fixed to the lower end of the upper stem 15 by welding. By such a configuration, the bellows 20 can concentrically expand and contract as the upper stem 15 moves up and down with the upper end portion 20a and the lower end portion 20b respectively on the fixed side and on the movable side.

By such a configuration, the bellows 20 partially seals the stem to separate the side of sites other than the lower end of the upper stem 15 and the handle stem 14 and the side of the lower end of the upper stem 15 and the lower stem 16 with the lower end portion 20b used as a separation boundary. In this case, the lower side of the stem is a region that can contact a fluid. However, on the upper side of the stem, a fluid is sealed through the sealing separation by the bellows 20. Thus, the fluid does not contact the stem, and the bellows 20 has a fluid sealing function for preventing the fluid from contacting the stem and separating the inside and the outside of the body 1 by sealing within the axial cylindrical portion 2.

Under a normal temperature, the resin-made valve disk 21 is in a valve closed state in FIG. 1 and is in a valve opened state in FIG. 2. An opening and closing operation of the cryogenic globe valve in this example is similar to an opening and closing operation of a normal globe valve. That is, in the valve opened state illustrated in FIG. 2, when the handle 17 is turned, the male threaded portion 18 in the handle stem 14 falls while being screwed into the female threaded portion 12 in the bonnet 8. The engagement portion 14a at the lower end of the handle stem 14 does not transmit a rotational force but transmits only a downward force to the upper flange portion 15a at the upper end of the upper stem 15, and the lower flange portion 15b at the lower end of the upper stem 15 transmits the downward force to the engagement portion 16b at the upper end of the lower stem 16 so that the resin-made valve disk 21 fastened to the lower end of the lower stem 16 can be seated on a valve seat seal surface 22. When the resin-made valve disk 21 is raised, an operation reverse thereto (reverse rotation of the handle 17) is performed. While the stem thus moves up and down, the stem is aligned and guided via an appropriate guide structure such as the guide portion 27.

Figure 3:
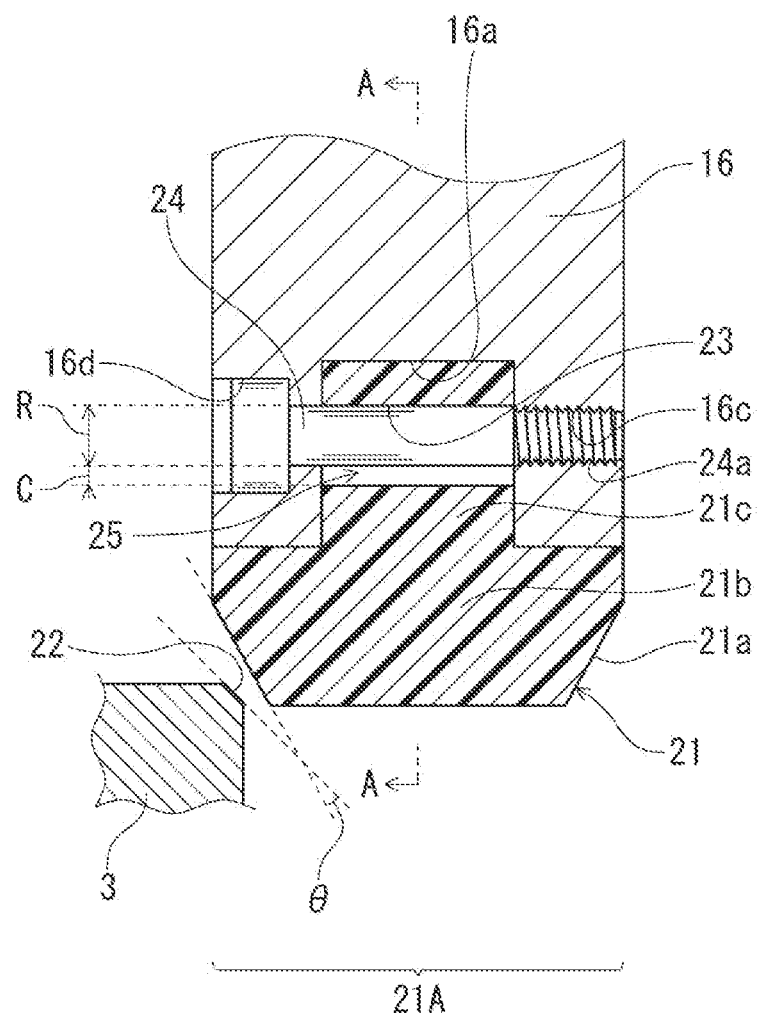
FIG. 3 is a partially enlarged sectional view illustrating an attachment structure of a stem and a resin-made valve disk in this example and obtained by enlarging a resin-made valve disk portion (under a normal temperature condition) illustrated in FIG. 1.
Figure 8:
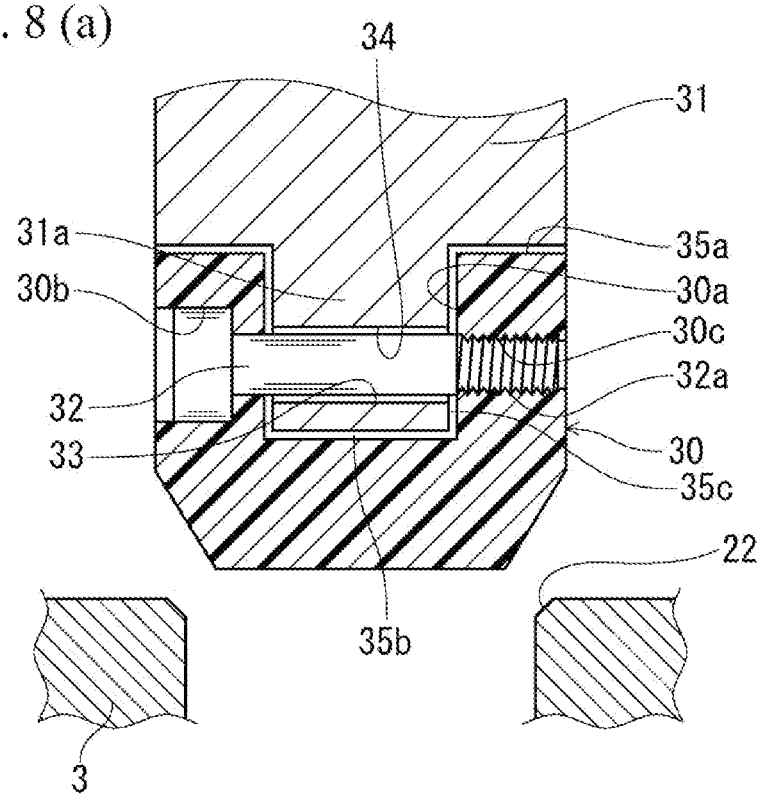
FIG. 8(*a*) is a partially enlarged sectional view of another example of an attachment structure of the stem and the resin-made valve disk in the present invention, and FIG. 8(*b*) is a partially enlarged sectional view of still another example of the attachment structure.
Figure 8:
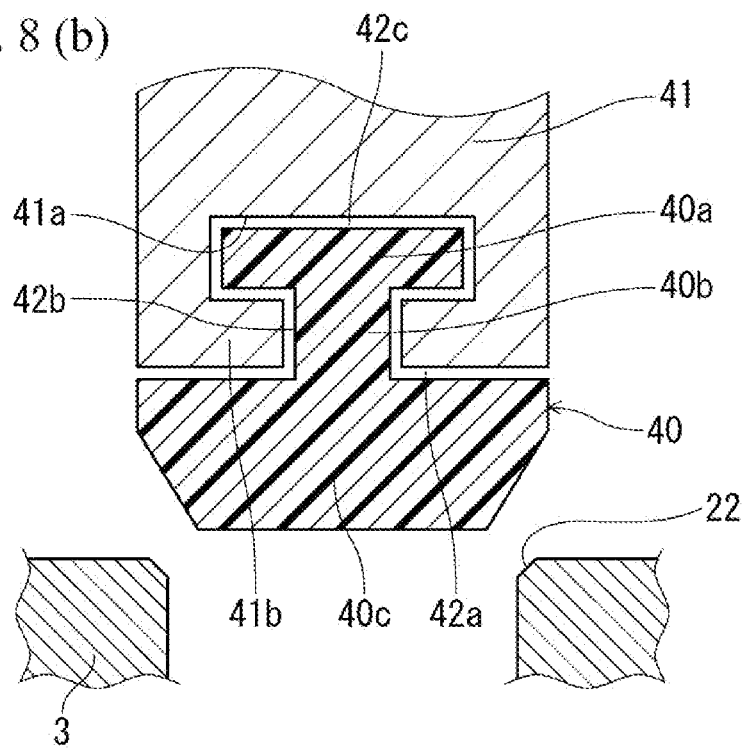

As described below, in the present invention, the axial cylindrical portion 2 as a long-neck structure is extended in the body 1, and the resin-made valve disk 21 having a conical surface having a reduced-diameter tapered shape is attached to a lower end of the elongated stem such that the resin-made valve disk 21 is three-dimensionally operable with respect to the stem even under an extremely low-temperature condition. Specifically, the resin-made valve disk 21 and the lower end of the stem are attached to each other with a predetermined attachment structure interposed therebetween. FIG. 3 illustrates the attachment structure in this example, FIG. 8(a) illustrates an attachment structure in another example, and FIG. 8(b) illustrates an attachment structure in still another example.

Figure 4:
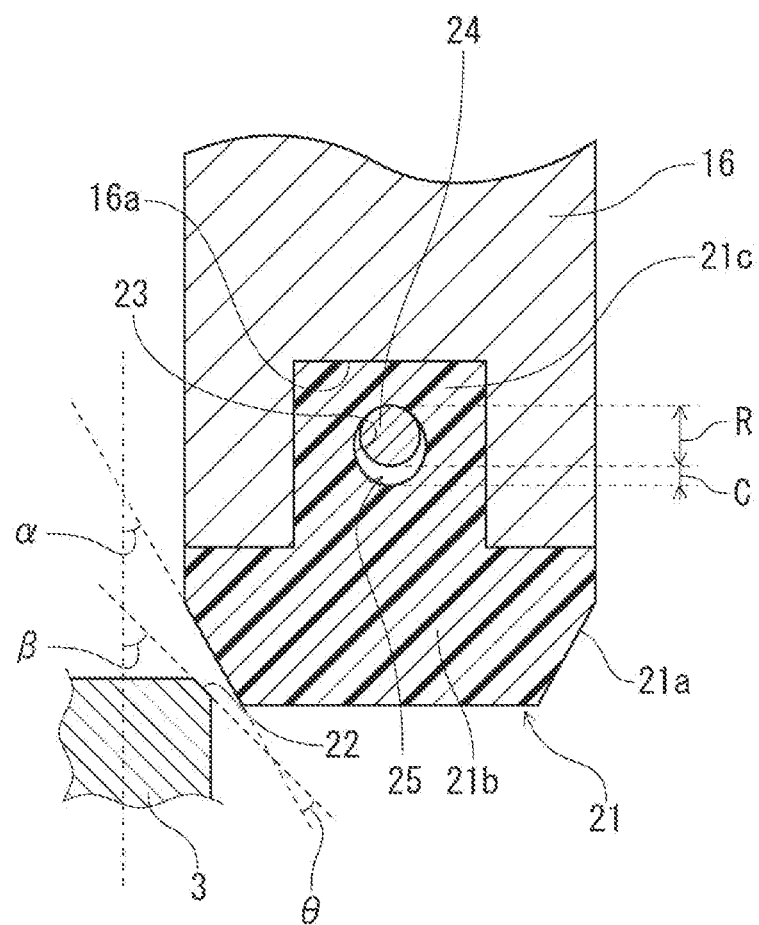
FIG. 4 is a partially sectional view taken along a line A-A in FIG. 3.

FIG. 3 and FIG. 4 illustrate an attachment structure of the resin-made valve disk 21 in this example under a normal temperature. The resin-made valve disk 21 can exhibit excellent mechanical strength and chemical stability and further a cryogenic resistance because the whole thereof is integrally formed of a PEEK (polyether ether ketone) material. The resin-made valve disk 21 is provided such that its thermal shrinkage rate is larger than that of the stem as a fixed-side member and is provided such that its hardness is smaller than that of the valve seat seal surface 22 on which the resin-made valve disk 21 is seated. A resin-made valve disk composed of a material other than the PEEK material is also appropriately selectable depending on implementation.

A thermal shrinkage rate means a decrease rate of a measure (a length and a volume) of a member with a decrease in temperature, and a large thermal shrinkage rate means that at least a linear expansion coefficient ($K^{-1}$) at a temperature of a fluid to be used is large. Generally, a linear expansion coefficient of a resin material (plastic) is approximately one order of magnitude larger than that of a metal, and is approximately two orders of magnitude larger than that of ceramics. In this example, the resin-made valve disk 21 is formed of the PEEK material while a stainless cutting product is used as the stem serving as the fixed-side member. Thus, in this example, the thermal shrinkage rate of the resin-made valve disk 21 can be kept sufficiently larger than that of a material for the stem (the fixed-side member).

The resin-made valve disk 21 is provided such that its hardness is lower than that of the material for the valve seat seal surface 22 on which the resin-made valve disk 21 is seated. A hardness means a Vickers hardness or a Rockwell hardness, for example, suited to compare mainly a metal material and a resin material with each other and commonly measure the materials. Although a configuration of the valve seat seal surface 22 is optionally selectable, as described below, the hardness of at least a valve disk seal surface 21a of the resin-made valve disk 21 is made smaller than the hardness of the vale seat seal surface 22 on which the resin-made valve disk 21 is seated, whereby a deterioration and a damage due to a collision in the seating can occur substantially on the side of the resin-made valve disk 21 even after a large number of times of valve opening and closing for a long period, for example, and a damage to the valve seat seal surface 22 high in maintenance cost can be avoided particularly when a foreign substance has been bitten in the seating.

The cryogenic globe valve in this example is sealed because all the portions inside the flow path are almost completely bonded to one another by welding, as described below, and can usually approach particularly a valve port portion only by attachment and detachment of the bonnet 8. However, the cryogenic globe valve is structured to be difficult to directly maintain because it needs to pass through the axial cylindrical portion 2 being elongated and having a small diameter even if the bonnet 8 is detached. Particularly when a metal touch at substantially equal hardnesses is used, the valve seat side is easily damaged. Thus, a damage to the valve seat seal surface 22 can be avoided as much as possible. The cryogenic globe valve is configured such that the valve seat seal surface 22 is not easily damaged by providing a significant difference between the hardnesses, as described above, to reduce a frequency of maintenance of the valve port portion that is not easily directly contacted. Maintenance work to be performed when the resin-made valve disk 21 has been damaged becomes easy because the stem may be usually merely pulled to replace the resin-made valve disk 21 with a new resin-made valve disk 21, and then returned and fixed again.

In FIG. 3 and FIG. 4, the entire resin-made valve disk 21 in this example is integrally formed. Particularly, at least the valve disk surface portion 21A as an entire surface on the lower end surface side does not have a gap occurring between separate members but is coplanarly provided. The valve disk surface portion 21A needs to have an axially symmetric shape coaxially with at least a stem axial center when the resin-made valve disk 21 is attached to the lower end of the stem to appropriately obtain an alignment effect of the resin-made valve disk 21 described below. The annular valve disk seal surface 21a is concentrically formed in a part of the conical surface (valve disk seal surface) 21a, and the valve disk seal surface 21a contacts the valve seat seal surface 22 to adhere thereto and separate therefrom with a valve opening or closing operation.

The resin-made valve disk 21 in this example includes a flange portion 21b having a substantially disk shape and the attachment portion 21c having a substantially columnar shape in an upper part of the flange portion 21b. The flange portion 21b has the conical surface 21a having a reduced-diameter tapered shape on its outer peripheral surface, and is a tapered or conical disk that is not flat, and the annular valve disk seal surface 21a is concentrically formed in a part of the conical surface (valve disk seal surface) 21a. An outer diameter of the attachment portion 21c is smaller than an outer diameter of the flange portion 21b, and is substantially the same as an inner diameter of the insertion portion 16a provided in the lower end of the stem. The insertion portion 16a and the attachment portion 21c are respectively provided as at least shapes that are adapted to each other, and can be appropriately fitted to each other under a normal temperature. The conical surface 21a is not limited to a conical surface as a complete cone shape, but may be formed as a curved surface slightly bent inward or outward, for example.

In FIG. 3 and FIG. 4, the valve seat seal surface 22 in this example is provided integrally with an opening of the primary-side flow path 4 in the body portion 3, and is set as the valve seat seal surface 22 having an enlarged-diameter tapered shape. A configuration of the valve seat seal surface 22 is optionally selectable depending on implementation by fastening, in addition to providing the valve seat seal surface 22 integrally with a corner having not a tapered shape but a perpendicular cross-sectional shape, for example, which is not illustrated, in addition to this example, or the body portion 3, like in this example, a sheet ring as a separate member to an annular mounting groove, for example.

In FIG. 4, a taper angle α of the valve disk seal surface 21a in this example is set as an acute angle smaller than a taper angle β of the valve seat seal surface 22, and specifically a difference θ between the angles α and β is set to approximately one degree. When an angle difference is thus set, the valve disk seal surface 21a and the valve seat seal surface 22 are brought into a substantially line contact shape. Particularly, the resin-made valve disk 21 is carved and is hardly flexible under an extremely low temperature. Thus, a high seal surface pressure can be ensured. Accordingly, the valve disk seal surface 21a (the seal portion) having a line contact shape formed in a part of the conical surface 21a does not greatly shift in position but can be maintained at substantially the same position due to an alignment effect in the present invention, described below, even after a large number of times of valve opening and closing.

In FIG. 3 and FIG. 4, the attachment portion 21c is provided with a through hole 23 having a hollow shape into which one bolt 24 as a fixing member in this example can be inserted, and a gap 25 having a volume and a shape sufficient to leave a clearance 26 (FIG. 5 to FIG. 7) having an appropriate volume is ensured even in a state where the resin-made valve disk 21, described below, has thermally contracted under an extremely low-temperature condition. As the fixing member, a pin structure, for example, is approximately selectable depending on implementation in addition to the bolt in this example.

In this example, a head of the bolt 24 is supported in such a shape as to fit within an enlarged-diameter portion 16d of a through hole formed in the lower end of the stem 16, and a male threaded portion 24a is screwed into a female threaded portion 16c. Thus, the resin-made valve disk 21 can be reliably attached to the stem without shaking, for example, and the clearance 26 can be ensured under an extremely low-temperature condition even when the stem is inclined, as described below, for example. Thus, an alignment effect in the present invention can also be reliably exhibited.

In the drawings, the through holes 16c and 16d are linearly formed in a transverse direction in the insertion portion 16a in the lower end of the stem. Respective positions and shapes of the through holes 16c and 16d are positions and shapes into which the bolt 24 can be inserted in common with the through hole 23 with the attachment portion 21c in the resin-made valve disk 21 fitted into the insertion portion 16a. A head (with a hexagonal hole) of the bolt 24 fits in the through hole 16d on one side, and the female threaded portion 16c that is screwed into the male threaded portion 24a in the bolt 24 is formed on the other side. The bolt 24 can be fastened by screwing and fastening a hexagonal wrench into and to the hexagonal hole of the head when fastened.

The length of the male threaded portion 24a is not particularly limited. For example, if the length of the male threaded portion 24a is set to a minimum required to fasten the resin-made valve disk 21, and specifically is set substantially equal to the length of the female threaded portion 16c so that an outer peripheral surface of at least the male threaded portion 24a does not face an inner peripheral surface of the through hole 23 with the resin-made valve disk 21 fastened, the resin-made valve disk 21 (the inner peripheral surface of the through hole 23) that finely operates avoids contacting a thread of the male threaded portion 24a when an alignment effect in the present application, described below, is exhibited. Note that if there is no problem even if the resin-made valve disk 21 contacts the thread of the male threaded portion 24a, an outer peripheral surface of the male threaded portion 24a may face the inner peripheral surface of the through hole 23. The male threaded portion 24a is preferably configured not to be easily damaged even if the resin-made valve disk (through hole) that finely operates contacts the male threaded portion 24a between the fixing member and the through hole in the present invention, like when configured not to be exposed to the inside of the through hole 23.

The volume of the through hole 23 in this example is the sum of the respective volumes of a space having a substantially columnar shape occupied by the bolt 24 and a space occupied by the gap 25. Specifically, a cross-sectional shape as the entire through hole 23 is a substantially large circular shape to a trapezoidal shape, as illustrated in FIG. 4. In FIG. 4, the gap 25 is a space obtained by subtracting the volume of the bolt 24 having a small circular cross-sectional shape from the volume of the through hole 23 having the cross-sectional shape. The upper side of the bolt 24 contacts the through hole 23, and the lower side of the bolt 24 faces the gap 25. In FIG. 3, the vertical width C of the gap 25 is approximately 0.2 mm. The vertical width C is preferably ensured to be at least 0.5% or more of a seal diameter of the resin-made valve disk 21 (the diameter of the valve disk seal surface 21a) because an alignment effect of the resin-made valve disk 21, described below, can be sufficiently exhibited. The diameter R of the bolt 24 illustrated in the drawing is approximately 3 mm.

The vertical width C of the gap 25 is preferably set using a seal diameter of the valve as a reference. The alignment effect in the present invention, described below, changes depending on to which degree the resin-made valve disk 21 can move. When the vertical width C of the gap 25 is small, a range in which the resin-made valve disk 21 can move is also correspondingly reduced. Thus, when the vertical width C is sufficiently ensured for the seal diameter, the alignment effect can be exhibited to the maximum. A range of the vertical width C is more preferably a range of 5 to 15% of the seal diameter, and still more preferably a range of 5 to 10% thereof. If the vertical width C is too large, a movable range of the resin-made valve disk 21 is too large so that a seating position on the valve seat seal surface 22 may shift. The seal diameter substantially matches a nominal diameter of the globe valve. When the range of the vertical width C of the gap 25 is set, as described above, a range of the nominal diameter of the valve in which an excellent alignment effect is obtained is a range of ½ to 3 inches, and more preferably a range of ½ to 2 inches.

Although the through hole 23 and the gap 25 in its inner part in this example are each ensured as the above-described position and shape, they are optionally selectable depending on implementation. For example, the hole 23 and the gap 25 can also be each ensured in another hollow shape and position as a gap under a normal temperature condition depending on each of characteristics such as a material and a shape of the resin-made valve disk 21 and a fastening structure to the stem, or the clearance may be provided not between the through hole and the fixing member but in an appropriate position and shape as a hollow portion in the resin-made valve disk. Nevertheless, the clearance 26 for permitting a fine operation required for the alignment effect of the resin-made valve disk 21 under an extremely low-temperature condition, described below, is provided to be able to be appropriately ensured inside or on the outer periphery side of the resin-made valve disk.

Figure 5:
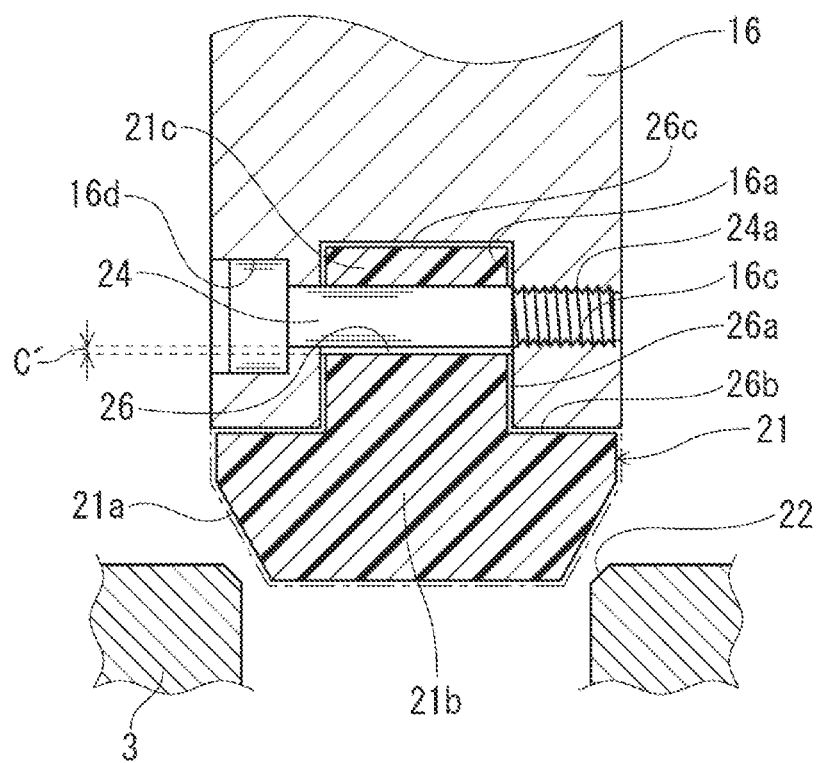
FIG. 5 is a cross-sectional view illustrating a resin-made valve disk that remains thermally contracting under an extremely low-temperature condition, in contrast to the resin-made valve disk under a normal temperature condition illustrated in FIG. 3.
Figure 6:
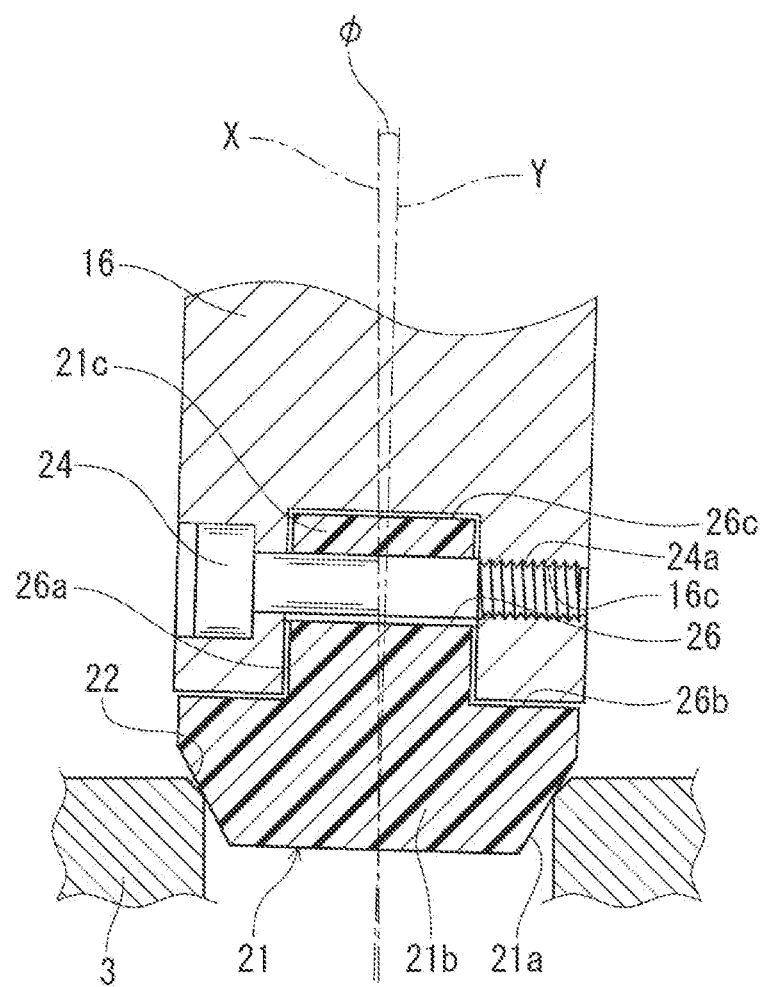
FIG. 6 is a cross-sectional view illustrating a state where a stem axial center is inclined and seated in FIG. 5.
Figure 7:
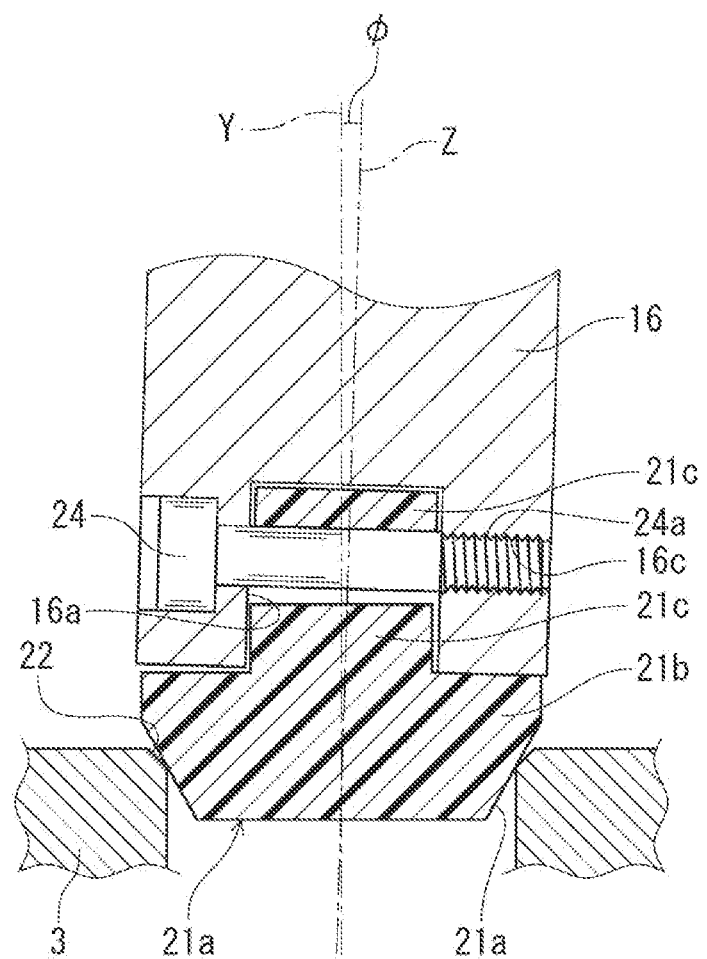
FIG. 7 is a cross-sectional view illustrating a state where the resin-made valve disk is seated in a correct posture by exhibiting an alignment effect for a valve seat subsequently to the state illustrated in FIG. 6.

Then, a valve closing function produced when the resin-made valve disk 21 under an extremely low-temperature condition is seated on the valve seat seal surface 22 will be described with reference to FIG. 5 to FIG. 7. FIG. 5 schematically illustrates the resin-made valve disk 21 that remains thermally contracting under an extremely low-temperature condition from a form of the resin-made valve disk 21 under a normal temperature condition illustrated in FIG. 3 and FIG. 4. A one-dot and dash line in the drawing schematically illustrates a shape of the resin-made valve disk 21 that has not thermally contracted under the normal temperature condition as illustrated in FIG. 3 and FIG. 4. FIG. 6 schematically illustrates a case where the stem axial center remains slightly inclined with respect to an axial center of the valve-seat seal surface 22 under an extremely low temperature illustrated in FIG. 5. FIG. 7 schematically illustrates an example of an alignment effect produced in the resin-made valve disk in the present invention.

In FIG. 5, in thermal contraction as a resin member occurring in the resin-made valve disk 21 in this example, it is considered that the resin-made valve disk 21 generally exhibits a mass shape integrally formed of a single material, and generally uniformly and isotropically contracts without being warped nor deformed due to a variation in contraction in consideration of a situation where it is quickly cooled to an extremely low temperature by liquefied hydrogen under a low temperature. In this case, the resin-made valve disk 21 generally similarly contracts at a predetermined shrinkage rate, as illustrated in the drawing. Therefore, under an extremely low-temperature condition, the resin-made valve disk 21 is cured with flexibility almost lost in this example by setting its outer shape as a shape as indicated by a solid line in the drawing, is hardly deformed during use in which it is exposed to liquefied hydrogen but is maintained while remaining attached to the lower end of the stem in this shape.

In FIG. 5, the gap 25 illustrated in FIG. 3 and FIG. 4 is set as described above. Even after the gap 25 thermally contracts, the clearance 26 remains between the bolt 24 as the fixing member and the through hole 23. A vertical width C' of the clearance 26 is approximately 0.1 mm, and the vertical width of the gap 25 contracts by approximately 50%.

When the resin-made valve disk 21 thermally contracts, portions in the resin-made valve disk 21 almost isotropically contract, respectively, at substantially constant shrinkage rates toward the inside of the resin-made valve disk 21. Thus, the resin-made valve disk 21 contracts in volume to fill the gap 25 illustrated in FIG. 3 and FIG. 4, and the reduced volume of the resin-made valve disk 21 can be made larger than that of a complete solid body that does not have such a hollow portion (the through hole 23) and cannot afford to contract because the volume of the gap 25 exists.

Particularly, a large allowance for contraction on the outer peripheral surface side of the resin-made valve disk 21 can be ensured. Thus, as illustrated in FIG. 5, a clearance 26a between an outer periphery of the attachment portion 21c and an inner periphery of the insertion portion 16a, a clearance 26b between a rear surface of the flange portion 21b and a lower end surface of the stem, or a clearance 26c between an end surface of the attachment portion 21c having a circular shape and a bottom surface of the insertion portion 16a can also be ensured in addition to the clearance 26 described below.

When the clearance 26 and the clearances 26a to 26c are ensured, a very small space in which a three-dimensional operation such as a slight inclination of an axial center of the resin-made valve disk 21 with respect to the stem axial center, a fine operation of the resin-made valve disk 21 in a direction along the stem axial center, or a slight rotation (twist) of the resin-made valve disk 21 with respect to the stem can be performed is ensured in the vicinity of an outer periphery of the resin-made valve disk 21 while the resin-made valve disk 21 remains reliably fixed to the lower end of the stem with the bolt 24 under an extremely low-temperature condition.

Conversely, in the conventional technique, a gap occurring as a result of thermal contraction between the resin-made valve disk and a member on the fixed side thereof has been known, as previously described. However, there exists only a technical idea to compensate for the gap to fill the gap via any means. Accordingly, there is no technical idea to attempt to use a gap occurring under an extremely low temperature. Accordingly, the clearance 26 or the clearances 26a to 26c, as described above, cannot be ensured under an extremely low-temperature condition. Therefore, it is significantly difficult or impossible to exhibit the alignment effect of the resin-made valve disk in the present invention, described below.

On the other hand, FIG. 6 schematically illustrates a state where an axial center Y of the resin-made valve disk 21 is inclined by an angle φ with respect to an axial center X of the valve seat seal surface 22, and illustrates a state where the stem axial center is inclined because the axial center Y matches the stem axial center in a case illustrated in the drawing. It can be said that the inclination of the stem axial center easily occurs particularly in the globe valve having the long-neck structure.

Specifically, an example of a cause of the inclination is first a misalignment in the stem. The stem is provided to be significantly larger than its diameter by the long-neck structure. Thus, there can occur products that cannot be accurately individually centered. When the plurality of products are each constituted by a plurality of connected components, as in this example, misalignment among the components may easily occur in connection parts. The stem is exposed to a cycle of an extreme temperature difference between a normal temperature and an extremely low temperature, and is provided under a situation of the extreme temperature difference between its upper and lower parts even at the time of use of the valve. Thus, any deformation can also occur from a deviation of partial denaturation of a material depending on the extreme temperature difference.

Further, as illustrated in FIG. 1, the stem rises and falls by screwing of the male threaded portion 18 in the handle stem 14 and the female threaded portion 12 in the bonnet 8. Thus, even when alignment in screw coupling is not sufficient, a shift between the axial centers X and Y can occur. Moreover, in a case of the cryogenic globe valve in this example, approximately 2000 to 2500 times is assumed as the number of times of opening and closing per year, for example, and a long-term use of several years or more is also assumed. When the cryogenic globe valve is thus used for a long period many times, it can be said that the inclination between the axial centers X and Y as illustrated in FIG. 6 further easily occurs in combination with a deterioration (a mechanical damage and a denaturation due to a temperature difference) of each of associated sites to coaxially keep the stem axial center, such as the stem (particularly the engagement portions 14*a* and 16*a*) and the resin-made valve disk 21 (particularly the through hole 23), the valve seat seal surface 22, or a screw coupling (the male threaded portion 18 and the female threaded portion 12) and the guide portion 27.

An inclined state of the axial center Y of the resin-made valve disk 21 with respect to the axial center X of the valve seat seal surface 22 can occur due to an inclination other than the inclination of the stem axial center, as described above. For example, the resin-made valve disk 21 is cured by contracting as a shape that has deviated because a deviation occurs in thermal contraction of the resin-made valve disk 21 so that symmetry of the shape that the resin-made valve disk 21 has under a normal temperature condition can also be lost. Accordingly, shape symmetry of the valve disk seal surface 21*a* can also be lost. Thus, in this case, compatibility with the valve seat seal surface 22 is also lost. Further, when a seal ring as a separate member is used as a valve seat seal surface, which is not illustrated, if the seal ring is deformed, a sealing property of the valve is still lost.

In any case, if at least the valve disk surface portion 21A is seated with the axial center Y of the resin-made valve disk 21 having an axisymmetric shape and the axial center X of the axisymmetric and annular valve seat seal surface 22 inclined, compatibility with the seal surface is lost. Thus, a sealing property of the valve cannot be kept.

On the other hand, FIG. 7 schematically illustrates an alignment effect of the resin-made valve disk 21 in the present invention. An axial center Z illustrated in FIG. 7 represents an axial center of the lower stem 16. In FIG. 6, the axial center Y and the axial center Z match each other. In FIG. 7, the axial center X and the axial center Y match each other, and only one of the axial centers is illustrated.

The above-described alignment effect usually acts as follows. First, as illustrated in FIG. 6, the valve disk seal surface 21*a* approaches and contacts the valve seat seal surface 22 with the axial center Y of the resin-made valve disk 21 (the axial center Z of the lower stem 16) inclined with respect to the axial center X of the valve seat seal surface 22. Accordingly, the resin-made valve disk 21 is inclined and seated, as in the drawing. Then, when the stem further falls, the inclined resin-made valve disk 21 is further pushed down by the stem from above so that the valve disk surface portion 21A is pushed into the valve seat seal surface 22.

When the valve disk surface portion 21A is thus pushed into the valve seat seal surface 22, the resin-made valve disk 21 can perform a three-dimensional fine operation using the clearance 26 and the clearances 26*a* to 26*c*. Accordingly, an alignment effect, as described below, naturally acts on the resin-made valve disk 21.

The resin-made valve disk 21 illustrated in FIG. 6 is seated with an outer peripheral surface of its conical portion shifting from the valve seat seal surface 22. Thus, respective contact regions of the resin-made valve disk 21 and the valve seat seal surface 22 contact each other in positions that deviate partially (toward a part of an annular region). Accordingly, the resin-made valve disk 21 in the drawing remains unstable, and a degree of freedom of rotation still remains at the axial center Y. In this state, when the lower end of the stem falls, the resin-made valve disk 21 is pushed downward from above. In a direction in which the resin-made valve disk 21 is pushed down, an inclination angle φ is a very small angle even if it occurs. Thus, the resin-made valve disk 21 is generally pushed down in a direction along the axial center X.

On the other hand, a state where the resin-made valve disk 21 is most stable is a state where a resultant force of reactions that the resin-made valve disk 21 receives from the valve seat seal surface 22 almost matches the direction along the axial center X. The state where the resin-made valve disk 21 is most stable usually matches a state where the resin-made valve disk 21 is seated in an originally correct seating posture by tapered surfaces being adapted to each other, and a degree of freedom of rotation no longer remains at the axial center Y.

In FIG. 6, when an external force in a direction along the axial center Y generally acts on the resin-made valve disk 21 in such an unstable posture, the resin-made valve disk 21 itself operates, aiming at the most stable state while finely operating to fill instability in principle. However, a degree of freedom required for an operation toward the most stable state is ensured by the clearances 26*a* to 26*c* being maintained, as described above.

Therefore, as illustrated in FIG. 7, the resin-made valve disk 21 itself can straighten the seating posture such that the axial center Y matches the axial center X through a three-dimensional fine operation using the clearances 26*a* to 26*c* by pushing down the lower end of the stem. In the present invention, such an alignment effect can be obtained in many embodiments in addition to the above-described embodiment. The resin-made valve disk 21 can be adjusted such that an appropriate alignment effect is obtained in consideration of various conditions such as respective specific shapes of the resin-made valve disk 21 and the valve seat seal surface 22, the volume of the gap, a frictional force between the resin-made valve disk 21 and the stem or a frictional force between the valve seat seal surface 22 and the valve disk seal surface 21a, a pressing force by the stem, and the magnitude of the inclination φ between the axial centers X and Y.

FIG. 8(a) illustrates a structure in which concavoconvex engagement between the resin-made valve disk 21 and the lower end of the stem is reversed in the above-described attachment structure in this example. That is, an insertion portion 30a provided in an upper part of a resin-made valve disk 30 is inserted into an attachment portion 31a provided in a lower end of a stem 31, a through hole 34 is formed in a direction intersecting a length direction of the stem 31 in the attachment portion 31a and the insertion portion 30a, a fixing member (a bolt 32) is inserted into the through hole 34 to attach the insertion portion 30a and the lower end of the stem 31 to each other, and a gap 33 is provided between the fixing member (the bolt 32) and the through hole 34, to maintain a clearance so that the resin-made valve disk 30 is movable with respect to the gap 33 when the resin-made valve disk 30 thermally contracts.

Specifically, in FIG. 8(a), the attachment portion 31a having a substantially columnar shape is concentrically protruded in the lower end of the stem 31, and the shape of the attachment portion 31a fits the shape of the insertion portion 30a formed at the center of the resin-made valve disk 30 under a normal temperature condition. The attachment portion 31a is provided with the through hole 34, and an inner diameter of the through hole 34 is made larger than an outer diameter of the bolt 32 to be inserted into the through hole 34, and the gap 33 in a predetermined amount can be ensured with the bolt 32 inserted into the through hole 34. A through hole 30b capable of fixing a head of the bolt 32 that remains inserted into the through hole 34 and a female threaded portion 30c to be screwed into a male threaded portion 32a in the bolt 32 are provided in the resin-made valve disk 30 (an outer diameter and a wall thickness of the insertion portion 30a) with the insertion portion 30a fitted in the attachment portion 31a.

FIG. 8(a) illustrates a state where the resin-made valve disk 30 has thermally contracted under an extremely low-temperature condition. In this state, a clearance is formed between the stem 31 and the resin-made valve disk 30, like in FIG. 5 in this example described above. Specifically, in FIG. 8(a), a clearance 35a between an upper end surface in the drawing of the resin-made valve disk 30 and an end surface on the outer periphery side of the attachment portion 31a in the stem 31, a clearance 35b between a bottom surface of the insertion portion 30a and a lower end surface of the attachment portion 31a, and further a clearance 35c between an inner peripheral surface of the insertion portion 30a and an outer peripheral surface of the attachment portion 31a are formed.

The clearances 35a to 35c are ensured around the resin-made valve disk 30, and the gap 33 is also ensured between the bolt 32 and the through hole 34. Thus, the resin-made valve disk 30 does not remain completely fastened to the stem 31, and a three-dimensional fine operation can be performed, like in this example described above. If the resin-made valve disk 30 remains attached to the stem 31 to be finely operable, the above-described alignment effect in the present invention can be exhibited.

FIG. 8(b) illustrates a structure in still another example of an attachment structure between the resin-made valve disk and the stem in the present invention. That is, an engagement portion 40a provided in an upper part of a resin-made valve disk 40 engages with an attachment groove 41a provided in a lower end of a stem 41, and the resin-made valve disk 40 and the lower end of the stem 41 are attached to each other with a predetermined gap interposed therebetween, to maintain a clearance so that the resin-made valve disk 40 is movable with respect to the gap when the resin-made valve disk 41 thermally contracts.

Specifically, in FIG. 8(b), the engagement portion 40a having a substantially T cross-sectional shape is formed in an upper part of the resin-made valve disk 40, and the engagement portion 40a is formed integrally with a flange portion 40c on the surface side of the valve disk with a narrow width portion 40b narrower than the engagement portion 40a having a large width interposed therebetween. The engagement portion 40a can engage with the attachment groove 41a provided in the lower end of the stem 41 and having a shape fitting respective shapes of the engagement portion 40a and the narrow width portion 40b under a normal temperature condition.

FIG. 8(b) illustrates a state where the resin-made valve disk 40 has thermally contracted under an extremely low-temperature condition. In the structure in the other example, the engagement portion 40a having a large width is reliably attached to the attachment groove 41a in the stem 41 by the narrow width portion 40b having a small width, while an allowance for thermal contraction of the resin-made valve disk 40 causes only a slight reduction in width. Thus, the resin-made valve disk 40 remains reliably attached to the stem 41 without departing from the stem 41 even if it thermally contracts under an extremely low-temperature condition.

In this state, a clearance is ensured between the resin-made valve disk 40 and the stem 41. Specifically, in FIG. 8(b), a clearance 42a between a rear surface of the flange portion 40c and a lower end surface of the stem 41, a clearance 42b between an outer peripheral surface of the narrow width portion 40b and the attachment groove 41a, and further a clearance 42c between an upper surface of the engagement portion 40a and a bottom surface of the attachment groove 41a are ensured.

The clearances 42a to 42c are ensured around the resin-made valve disk 40. Thus, the resin-made valve disk 40 does not remain completely fastened to the stem 41, but can perform a three-dimensional fine operation, like in this example described above. If the resin-made valve disk 40 remains attached to the stem 41 to be finely operable, the above-described alignment effect in the present invention can be exhibited.

For the cryogenic globe valve having the structure in the above-described embodiment, a leakage test using helium gas was performed. As a cryogenic globe valve for the test, a globe valve made of stainless steel having a class of 150 and having a nominal diameter of 1 inch was used. As the leakage test, a test for sealing liquefied hydrogen at a temperature of −253° C. into the cryogenic globe valve to cool the cryogenic globe valve, performing an opening and closing operation a predetermined number of times in the state, releasing the liquefied hydrogen from the cooled cryogenic globe valve, then quickly supplying helium gas to the primary side of the cryogenic globe valve in a fully closed state, and confirming leakage of the helium gas from the secondary side using a water displacement method was performed. In this case, the pressure of helium gas was set to 2.1 MPa based on a TTO guidance in Japan.

As the leakage test, tests up to the respective times when valve opening/closing was performed zero time, 1000 times, and 2000 times, tests up to the respective times when valve opening/closing was performed 3000 times and 4000 times, and tests up to the time when valve opening/closing was performed 5000 times were respectively performed on the first day, the second day, and the third day. When the test was started on each of the days, the leakage test was performed in a state before the cryogenic globe valve was cooled using liquefied hydrogen. When all the tests on the first day and the second day ended, the leakage test was performed even after the cryogenic globe valve for the test raised from an extremely low temperature to a normal temperature by being supplied with hydrogen gas at a normal temperature.

In any of the leakage tests, leakage of helium gas from a valve seat was not confirmed, but it was confirmed that the cryogenic globe valve according to the present invention could exhibit a high sealing property even under the condition that a cryogenic fluid such as liquefied hydrogen is handled. Moreover, even if the cryogenic globe valve was exposed to a temperature cycle of a normal temperature, an extremely low temperature, and a normal temperature, it was also confirmed that a high sealing property could be maintained. 5000 times as a final number of opening and closing operations corresponds to 5000 times as a number of times of endurance of a bellows (corresponding to the bellows 20 in the above-described embodiment) used for a cryogenic bellows valve for the test. This also has proved that a sealing property of the valve seat of the cryogenic globe valve according to the present embodiment could exhibit durability at the same level as that of a sealing property in a bellows portion.

Figure 9:
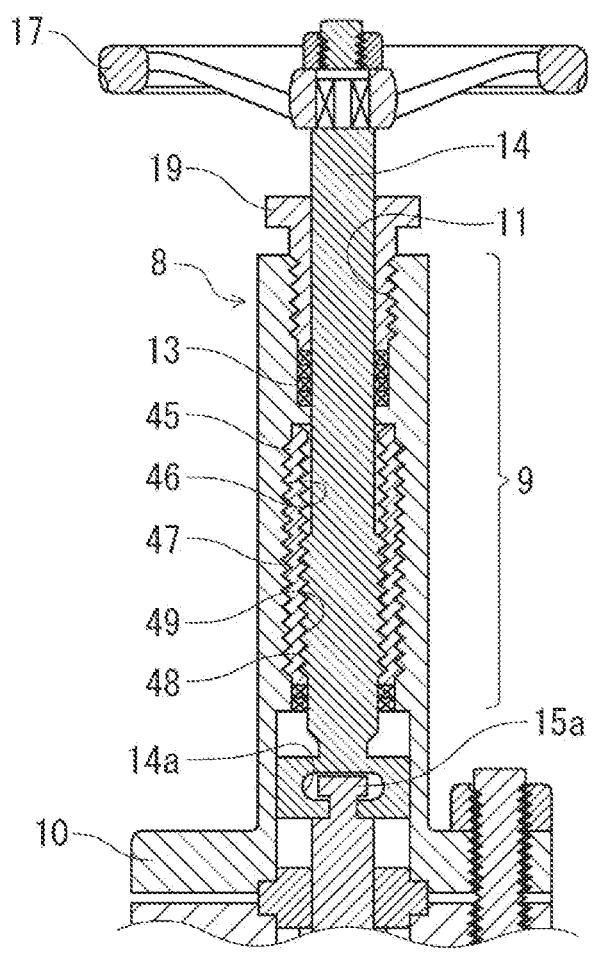
FIG. 9 is a partially enlarged view illustrating another configuration example of a stem elevating mechanism of the cryogenic globe valve illustrated in FIG. 1.

Then, another configuration example of a mechanism for raising and lowering a stem by turning of a handle will be described with reference to the drawing. FIG. 9 is a partially enlarged view illustrating another configuration example of a mechanism for raising and lowering a stem of the cryogenic globe valve illustrated in FIG. 1. The same reference numeral is used for a portion, which is common to that in the cryogenic globe valve illustrated in FIG. 1, in the cryogenic globe valve illustrated in FIG. 9, and description thereof is omitted.

The cryogenic globe valve illustrated in FIG. 1 is configured such that the stem can be raised and lowered by screwing the male threaded portion 18 of a trapezoidal screw provided in a lower part of the handle stem 14 and the female portion 12 of a trapezoidal screw formed on an inner peripheral surface of the bonnet 8 into each other and turning the handle 17 attached to an upper part of the handle stem 14. When the female threaded portion 12 of the trapezoidal screw is thus formed on the inner peripheral surface of the bonnet 8, the female threaded portion 12 is formed by so-called bump processing so that cutting processing using a blade is not easily performed because there are steps, as can be seen from FIG. 1.

In another configuration example illustrated in FIG. 9, a sleeve 45 made of copper is interposed between a bonnet 8 and a handle stem 14 to make processing of a female threaded portion 12 easy. A male threaded portion 47 of a triangular screw, which is formed on an inner peripheral surface of the bonnet 8, to be screwed into a female threaded portion 46 of the triangular screw is formed on an outer periphery of the sleeve 45, and a female threaded portion 49 of a trapezoidal screw, which is formed in the handle stem 14, to be screwed into a male threaded portion 48 of the trapezoidal screw is formed on the inner peripheral surface of the sleeve 45.

When the male threaded portion 47 in the sleeve 45 is screwed into and fastened to the female threaded portion 46 on the inner peripheral surface of the bonnet 8, the sleeve 45 can be fixed to the bonnet 8. In this state, when the female threaded portion 49 in the sleeve 45 and the male threaded portion 48 in the handle stem 14 are screwed into each other, the handle stem 14 can be raised and lowered by turning a handle 17 attached to an upper part of the handle stem 14.

As described above, the sleeve 45 is made of copper and is softer than stainless steel. Thus, cutting processing using a blade can be easily performed because it is simpler to form the female threaded portion of the trapezoidal screw on the inner peripheral surface of the sleeve 45 than to form the female threaded portion on the inner peripheral surface of the bonnet 8 made of stainless steel and the female threaded portion 49 is pierced with the blade when formed.

While the embodiment of the present invention has been described in detail above, the present invention is not limited to the above-described embodiment, but various changes can be made without departing from the scope and spirit of the invention described in claims of the present invention.

REFERENCE SIGNS LIST

1 body
2 axial cylindrical portion (body)
3 body portion (body)
9 ground portion
13 ground packing (ground sealing structure)
14 handle stem (stem)
15 upper stem (stem)
16 lower stem (stem)
16a insertion portion
16c 16d through hole
20 bellows (bellows structure)
20a upper end portion
20b lower end portion
21 30 40 resin-made valve disk
21a conical surface (valve disk seal surface)
21b flange portion (resin-made valve disk)
21c attachment portion (resin-made valve disk)
22 valve seat seal surface
23 through hole
24 bolt (fixing member)
25 gap
26 clearance
26a 26b 26c clearance
31 41 stem
30a insertion portion
31a attachment portion
33 gap
34 through hole
35a 35b 35c clearance
40a engagement portion
41a attachment groove
42a 42b 42c clearance

The invention claimed is:
1. A cryogenic globe valve comprising:
a body portion;
an axial cylindrical portion having a long-neck structure extended into the body portion;
an elongated stem having an insertion portion provided in a lower of end of the elongated stem; and a resin-made valve disk attached to a lower end of the elongated stem, the resin-made valve disk having a conical surface defining a reduced-diameter tapered shape, wherein an attachment portion is provided in an upper part of the resin-made valve disk, and the attachment portion is inserted into the insertion portion of the elongated stem, a through hole is formed in a direction intersecting a length direction of the stem in the insertion portion and the attachment portion, a fixing member is inserted into the through hole to attach the attachment portion and the insertion portion to each other, a gap is provided between the fixing member and the through hole to maintain a clearance in which the resin-made valve disk is movable when the resin-made valve disk thermally contracts, and a vertical width of the clearance between facing surfaces of the through hole and the fixing member under an extremely low temperature condition is set to 0.5% or more of a seal diameter of the resin-made valve disk such that the resin-made valve disk is three-dimensionally operable with respect to the stem even under an extremely low-temperature condition.

2. The cryogenic globe valve according to claim 1, wherein an angle of a valve disk seal surface of the resin-made valve disk is smaller than an angle of a valve seat seal surface provided in the body portion.

3. The cryogenic globe valve according to claim 2, wherein a ground portion is provided at an upper end of the axial cylindrical portion, and an upper part of the axial cylindrical portion is made to have a bellows structure such that a cryogenic fluid does not flow into the ground portion side and is made to have a ground sealing structure sufficient for the cryogenic fluid at a pressure exceeding an atmospheric pressure to leak out of the ground portion.

4. The cryogenic globe valve according to claim 1, wherein a ground portion is provided at an upper end of the axial cylindrical portion, and an upper part of the axial cylindrical portion is made to have a bellows structure such that a cryogenic fluid does not flow into the ground portion side and is made to have a ground sealing structure sufficient for the cryogenic fluid at a pressure exceeding an atmospheric pressure to leak out of the ground portion.

5. The cryogenic globe valve according to claim 4, wherein an angle of a valve disk seal surface of the resin-made valve disk is smaller than an angle of a valve seat seal surface provided in the body portion.

6. A cryogenic globe valve comprising:
a body portion;
an axial cylindrical portion having a long-neck structure extended into the body portion;
an elongated stem having an attachment portion provided at a lower of end of the elongated stem; and
a resin-made valve disk attached to a lower end of the elongated stem, the resin-made valve disk having a conical surface defining a reduced-diameter tapered shape, wherein an insertion portion is provided in an upper part of the resin-made valve disk, and the attachment portion provided at the lower end of the elongated stem is inserted into the insertion portion provided in the upper part of the resin-made valve disk, a through hole is formed in a direction intersecting a length direction of the stem in the attachment portion and the insertion portion, a fixing member is inserted into the through hole to attach the insertion portion and the lower end of the stem to each other, a gap is provided between the fixing member and the through hole to maintain a clearance so that the resin-made valve disk is movable with respect to the gap when the resin-made valve disk thermally contracts, and a vertical width of the clearance between facing surfaces of the through hole and the fixing member is set to 0.5% or more of a seal diameter of the resin-made valve disk such that the resin-made valve disk is three-dimensionally operable with respect to the stem even under an extremely low-temperature condition.

7. The cryogenic globe valve according to claim 6, wherein a ground portion is provided at an upper end of the axial cylindrical portion, and an upper part of the axial cylindrical portion is made to have a bellows structure such that a cryogenic fluid does not flow into the ground portion side and is made to have a ground sealing structure sufficient for the cryogenic fluid at a pressure exceeding an atmospheric pressure to leak out of the ground portion.

8. The cryogenic globe valve according to claim 6, wherein an angle of a valve disk seal surface of the resin-made valve disk is smaller than an angle of a valve seat seal surface provided in the body portion.

9. A cryogenic globe valve comprising:
a body portion;
an axial cylindrical portion having a long-neck structure extended in the body portion;
an elongated stem having an insertion portion provided in a lower of end of the elongated stem; and
a resin-made valve disk attached to a lower end of the elongated stem, the resin-made valve disk having a conical surface defining a reduced-diameter tapered shape, wherein an attachment portion is provided in an upper part of the resin-made valve disk, and the attachment portion is inserted into the insertion portion of the elongated stem, a through hole is formed in a direction intersecting a length direction of the stem in the insertion portion and the attachment portion, a fixing member having at least one part that is fixed to the through hole to connect the attachment portion and insertion portion in a state in which the entire fixing member is inserted into the through hole of the attachment portion to maintain a clearance in which the resin-made valve disk is movable with respect to a gap between facing surfaces of the fixing member and the through hole of the attachment portion, and facing surfaces of the resin-made valve disk and the stem when the resin-made valve disk thermally contracts such that the resin-made valve disk is three-dimensionally operable with respect to the stem even under an extremely low-temperature condition.

10. The cryogenic globe valve according to claim 9, wherein an angle of a valve disk seal surface of the resin-made valve disk is smaller than an angle of a valve seat seal surface provided in the body portion.

11. The cryogenic globe valve according to claim 9, wherein a ground portion is provided at an upper end of the axial cylindrical portion, and an upper part of the axial cylindrical portion is made to have a bellows structure such that a cryogenic fluid does not flow into the ground portion side and is made to have a ground sealing structure sufficient for the cryogenic fluid at a pressure exceeding an atmospheric pressure to leak out of the ground portion.

12. The cryogenic globe valve according to claim 11, wherein an angle of a valve disk seal surface of the resin-made valve disk is smaller than an angle of a valve seat seal surface provided in the body portion.

* * * * *